(12) United States Patent
Wu

(10) Patent No.: US 11,677,938 B2
(45) Date of Patent: Jun. 13, 2023

(54) METHOD TO REDUCE CONTOUR ARTIFACTS ON RECURSIVE TEMPORAL FILTERS

(75) Inventor: Siu-Wai Wu, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 1095 days.

(21) Appl. No.: 12/112,440

(22) Filed: Apr. 30, 2008

(65) Prior Publication Data

US 2009/0273716 A1    Nov. 5, 2009

(51) Int. Cl.
*H04N 19/117* (2014.01)
*H04N 19/80* (2014.01)
*H04N 19/86* (2014.01)

(52) U.S. Cl.
CPC ........... *H04N 19/117* (2014.11); *H04N 19/80* (2014.11); *H04N 19/86* (2014.11)

(58) Field of Classification Search
CPC ....... H04N 19/80; H04N 19/86; H04N 19/117
See application file for complete search history.

(56) References Cited

U.S. PATENT DOCUMENTS

| | | | | |
|---|---|---|---|---|
| 4,597,021 A * | 6/1986 | Yamamitsu | ............... | H04N 5/21 348/E5.077 |
| 4,827,342 A * | 5/1989 | Ohta | ......................... | H04N 5/21 348/622 |
| 5,006,927 A * | 4/1991 | Creed | ....................... | H04N 9/78 348/624 |
| 5,600,731 A * | 2/1997 | Sezan et al. | ................... | 382/107 |
| 5,852,475 A * | 12/1998 | Gupta | ........................ | G06T 5/20 348/606 |
| 5,910,909 A | 6/1999 | Purcell et al. | | |
| 5,995,154 A * | 11/1999 | Heimburger | ................... | 348/448 |
| 6,005,638 A * | 12/1999 | Blair et al. | ..................... | 348/607 |
| 6,061,100 A * | 5/2000 | Ward et al. | ..................... | 348/607 |
| 6,178,205 B1 * | 1/2001 | Cheung et al. | ........... | 375/240.29 |
| 6,731,299 B2 | 5/2004 | Wang et al. | | |
| 6,731,822 B1 | 5/2004 | Sobel et al. | | |
| 6,757,443 B1 * | 6/2004 | Kondo | ....................... | H04N 5/21 382/275 |
| 7,050,501 B2 * | 5/2006 | Alvarez | .................... | 375/240.16 |
| 7,068,722 B2 * | 6/2006 | Wells | ...................... | 375/240.16 |
| 7,221,375 B2 | 5/2007 | Hall et al. | | |
| 2004/0012722 A1 * | 1/2004 | Alvarez | ........................ | 348/700 |

(Continued)

OTHER PUBLICATIONS

C. Hansen, et al., Active Control of Noise and Vibration, Second Edition, vol. 1. pp. 412-415 and 573-581. CRC Press, 2012. ISBN 978-1-4822-3400-8.

(Continued)

*Primary Examiner* — Yassin Alata
(74) *Attorney, Agent, or Firm* — Chernoff, Vilhauer, McClung & Stenzel, LLP

(57) ABSTRACT

A method and encoding system for reducing artifacts in a digital video sequence of image frames. The method acquires a current frame of the digital video sequence, and retrieves a previous frame of the digital video sequence from a frame delay. The method applies a recursive temporal filter to the current frame and the previous frame to generate a filtered frame. The method then applies a mixer to the current frame and the filtered frame to generate an output frame. The method stores the output frame in the frame delay.

21 Claims, 3 Drawing Sheets

(56) References Cited

U.S. PATENT DOCUMENTS

| | | | |
|---|---|---|---|
| 2005/0135698 A1* | 6/2005 | Yatsenko et al. | 382/260 |
| 2006/0023794 A1* | 2/2006 | Wan et al. | 375/240.29 |
| 2007/0195199 A1* | 8/2007 | Chen et al. | 348/607 |
| 2008/0181517 A1* | 7/2008 | Aokage | 382/236 |

OTHER PUBLICATIONS

P.S.R. Diniz, Adaptive Filtering: Algorithms and Practical Implementation, 4th Edition, pp. 1-4 and 411. Springer Science & Business Media, 2012. ISBN 978-1-4614-4106-9.

* cited by examiner

METHOD TO REDUCE CONTOUR ARTIFACTS ON RECURSIVE TEMPORAL FILTERS

BACKGROUND

Field of the Invention

The present invention relates, in general, to digital video noise reduction processing. In particular, aspects of the present invention provide a method for reducing artifacts in a digital video sequence of image frames.

Description of the Related Art

Temporal video noise reduction methods include motion adaptive and motion compensative methods. A motion adaptive temporal filter method works best in stationary video sequences because it assumes that noise causes the only difference between successive frames and that the noise is random with a mean of zero. The motion adaptive temporal filter removes noise by averaging the target pixel with the corresponding pixels in the previous frames for which it is relatively detected as a still pixel, therefore reducing the noise without impairing the spatial resolution of the image. A motion compensative temporal filter method functions similar to the motion adaptive temporal filter, but it performs filtering along moving object trajectories. The motion compensative temporal filter method requires more processing time than the motion adaptive methods, but produces better results. It is often desirable to apply a motion adaptive or motion compensated recursive temporal filter to reduce the input video noise and thereby improve the compression efficiency of the encoder.

Contour artifacts are seen on images when there are not enough bits to represent the change of pixel intensity in the image. This effect is particularly visible in smooth gradient regions such as dark video with low contrast where a small gradient of 8-bit digitized pixel levels span across a large area of the image. These artifacts can be especially objectionable in image areas having spatially smooth intensity variations such as sky, skin, and large homogeneous surfaces such as walls. In natural video, the visibility of the contour is often masked due to the dither effect caused by random noise in the input video. The random noise introduced by the dithering into the image effectively breaks up the contouring artifacts. In digital video, one method of reducing the contour artifacts is to use dithering to add Gaussian noise to the image to break up the contour lines, but the addition of Gaussian noise can also reduce the image contrast. Moreover, adding Gaussian noise to the image creates new artifacts and increases the number of bits in the compressed image.

The motion adaptive (or compensated) temporal filter applies a temporal recursive filter to stabilize the video frames when there is only a small difference between the current pixel and the previously filtered pixel at the same location (or along the motion trajectory). The temporal recursive filter is an effective technique to reduce random noise in the video, but it eliminates the natural fluctuations in the signal level of the video frames, thereby making the contour artifacts more visible. It is also desirable not to introduce extra noise to the image such as dithering.

SUMMARY

A method and encoding system for reducing artifacts in a digital video sequence of image frames. The method acquires a current frame of the digital video sequence, and retrieves a previous frame of the digital video sequence from a frame delay. The method applies a recursive temporal filter to the current frame and the previous frame to generate a filtered frame. The method then applies a mixer to the current frame and the filtered frame to generate an output frame. The method stores the output frame in the frame delay.

The recursive temporal filter computes a pixel difference for each pixel in the current frame, and each corresponding pixel in the previous frame. To generate a filtered frame, the recursive temporal filter computes a pixel value for each pixel in the filtered frame based on the pixel difference. When the pixel difference is above an upper threshold, the pixel value is equal to a value of the pixel in the current frame, and when the pixel difference is below the upper threshold, the pixel value is a sum of the value of the pixel in the current frame and an adjustment based on the pixel difference. In another embodiment, when the pixel difference is below a lower threshold, the pixel value is equal to the value of the pixel in the current frame.

The mixer computes a pixel difference between each filtered pixel and each input pixel at a corresponding location. To generate the output frame, the mixer computes a pixel value for each pixel in the output frame based on the pixel difference. When the pixel difference is above an upper threshold, the pixel value is equal to a value of the pixel in the filtered frame, and when the pixel difference is below the upper threshold, the pixel value is a sum of the value of the pixel in the current frame and an adjustment based on the pixel difference.

DETAILED DESCRIPTION

Figure 1:
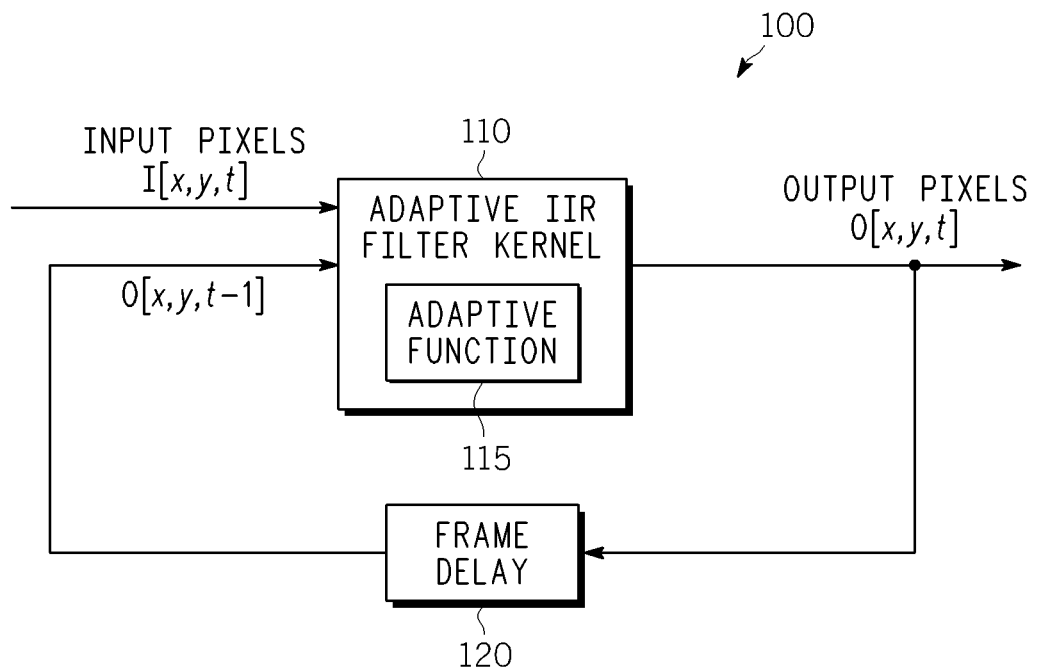
FIG. 1 is a block diagram that illustrates an exemplary embodiment of a prior art motion adaptive recursive temporal filter.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Before describing in detail embodiments that are in accordance with the present invention, it should be observed that the embodiments reside primarily in combinations of method steps and apparatus components related to reducing the contour artifacts that are present after processing digital video through a recursive temporal filter, while preserving the effectiveness of the recursive temporal filter. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Figure 2:
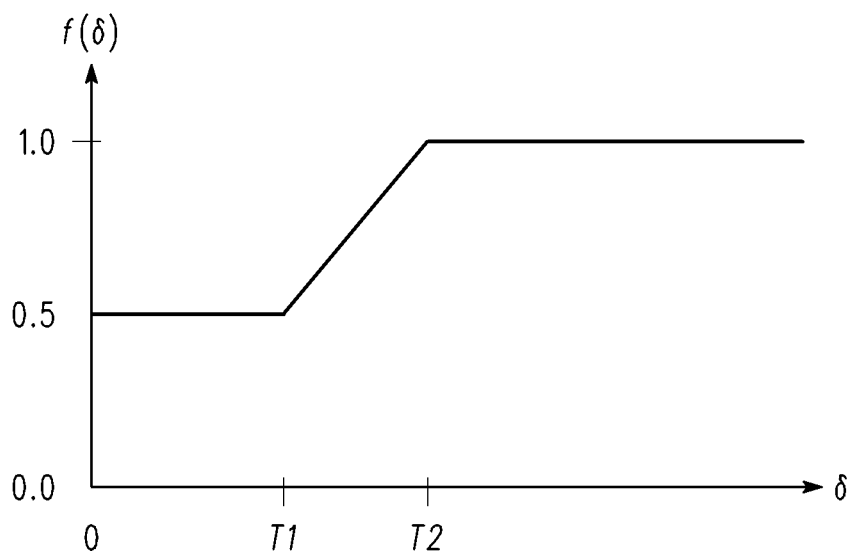
FIG. 2 is a graph that illustrates an exemplary embodiment of a prior art non-linear adaptive function for the prior art motion adaptive recursive temporal filter shown in FIG. 1.

FIG. 1 is a block diagram that illustrates an exemplary embodiment of a prior art motion adaptive recursive temporal filter. As shown in FIG. 1, the motion adaptive recursive temporal filter 100 includes an adaptive infinite impulse response (IIR) filter kernel 110, and a frame delay 120. In one embodiment, the motion adaptive recursive temporal filter 100 is implemented in an MPEG2 video compression encoder, such as that described in U.S. Pat. No. 5,910,909. The adaptive IIR filter kernel 110 receives two inputs, the input pixels from the current process frame, and the output pixels from the previous process frame. The adaptive IIR filter kernel 110 applies these two inputs to an adaptive function 115 to calculate the output pixels for the current process frame. The frame delay 120 stores the output pixels from the previous process frame for use in calculating the output pixels for the current process frame. The adaptive IIR filter kernel 110 performs the following operation:

$$O[x,y,t]=O[x,y,t-1]+f(|I[x,y,t]-O[x,y,t-1]|)\times(I[x,y,t]-O[x,y,t-1]),$$

where $I[x,y,t]$ is the input pixel value at location (x,y) at time (frame number) t, $O[x,y,t]$ is the output pixel value at location (x,y) at time (frame number) t, and $f(\delta)$ is a non-linear function that has the characteristics shown in FIG. 2.

FIG. 2 is a graph that illustrates an exemplary embodiment of a prior art non-linear adaptive function 115 for the prior art motion adaptive recursive temporal filter 100 shown in FIG. 1. As shown in FIG. 2, the transition of $f(\delta)$ from 0.5 to 1.0 typically occurs when δ takes on small values. For example, the adaptive IIR filter kernel 110 has produced satisfactory results when T1=2 and T2=6. When $f(\delta)$ is 1.0, the input pixel is passed through to the output pixel without any change, but when $f(\delta)$ is 0.5, the output pixel is the average of the input pixel and the frame-delayed output pixel.

Figure 3:
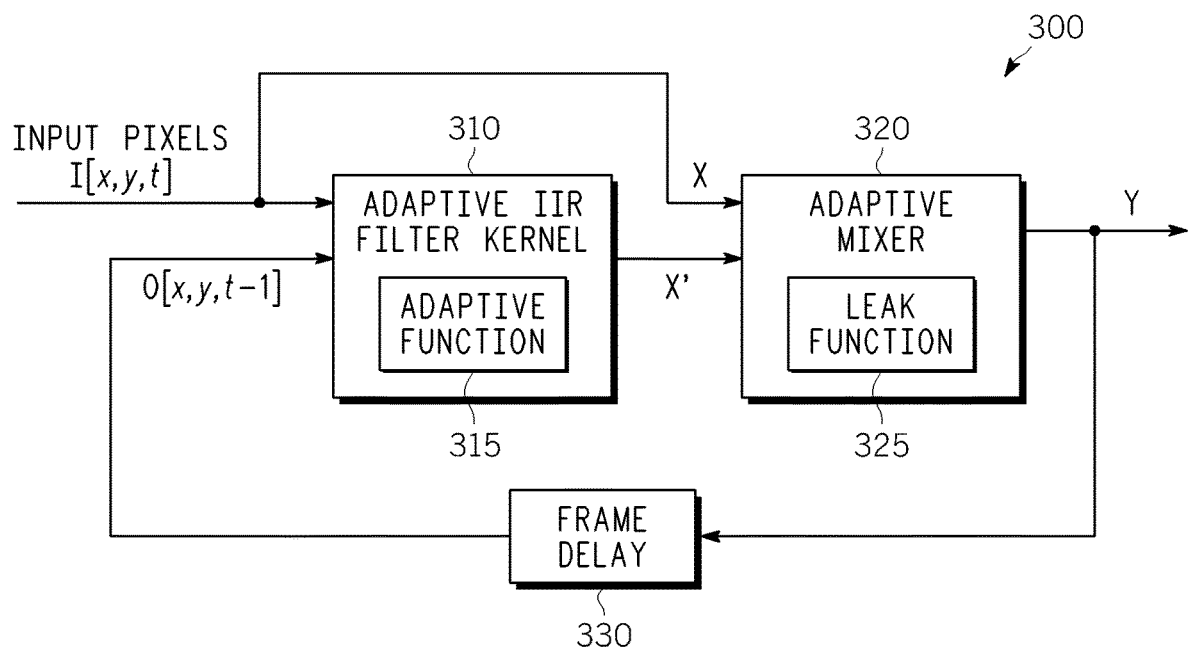
FIG. 3 is a block diagram that illustrates an exemplary embodiment of a leaky motion adaptive recursive temporal filter.

FIG. 3 is a block diagram that illustrates an exemplary embodiment of a leaky motion adaptive recursive temporal filter. As shown in FIG. 3, the leaky motion adaptive recursive temporal filter 300 includes an adaptive IIR filter kernel 310, an adaptive mixer 320, and a frame delay 330.

The adaptive IIR filter kernel 310 receives two inputs, the input pixels from the current process frame, and the output pixels from the previous process frame. The adaptive IIR filter kernel 310 applies these two inputs to an adaptive function 315 to calculate processed pixels. The adaptive mixer 320 also receives two inputs, the input pixels from the current process frame, and the processed pixels for the current process frame (i.e., the output from the adaptive IIR filter kernel 310). The adaptive mixer 320 applies these two inputs to a leak function 325 to calculate the output pixels for the current process frame. The frame delay 320 stores the output pixels for the current process frame for use in calculating the output pixels for the next process frame.

In one embodiment, the functions performed by the adaptive IIR filter kernel 310 and the adaptive function 315 are the same as the functions performed by the adaptive IIR filter kernel 110 and the adaptive function 115 shown in FIG. 1. Thus, in that embodiment, the adaptive IIR filter kernel 310 performs the following operation:

$$O[x,y,t]=O[x,y,t-1]+f(|I[x,y,t]-O[x,y,t-1]|)\times(I[x,y,t]-O[x,y,t-1]),$$

where $I[x,y,t]$ is the input pixel value at location (x,y) at time (frame number) t, $O[x,y,t]$ is the output pixel value at location (x,y) at time (frame number) t, and $f(\delta)$ is a non-linear function that has the characteristics shown in FIG. 2.

Figure 4:
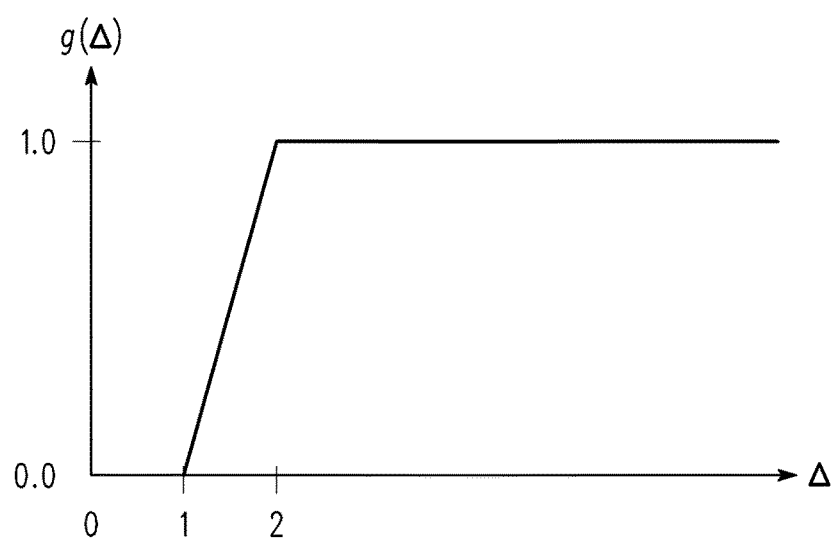
FIG. 4 is a graph that illustrates an exemplary embodiment of a non-linear leak function for the leaky motion adaptive recursive temporal filter shown in FIG. 3.

The leaky motion adaptive recursive temporal filter 300 reduces the contour artifacts introduced by the adaptive IIR filter kernel 310 by allowing a small amount of noise to "leak" through the filter. The output of the adaptive IIR filter kernel 300 is blended with the input pixels by the adaptive mixer 320. The input pixels are passed through the adaptive mixer 320 when the difference between the filtered output pixels from the adaptive IIR filter kernel 310 and the input pixels is less than or equal to a just noticeable perceptual threshold. With 8-bit representation of the luminance signal of the image, the value of 1 is empirically chosen as the threshold. The adaptive mixer 320 has the following characteristic:

$$Y=X+g(|X'-X|)\times(X'-X),$$

where Y is the output pixel value, X is the input pixel value, X' is the filtered output pixels from the adaptive IIR filter kernel 310, and $g(\Delta)$ is a non-linear leak function 325 that has the characteristics shown in FIG. 4. While small amplitude noise is passed through the adaptive mixer 320, large amplitude noise is still effectively suppressed by the recursive temporal filter.

FIG. 4 is a graph that illustrates an exemplary embodiment of a non-linear leak function 325 for the adaptive mixer 320 of the leaky motion adaptive recursive temporal filter 300 shown in FIG. 3. As shown in FIG. 4, the transition of $g(\Delta)$ from 0.0 to 1.0 typically occurs at small values of Δ. For example, the adaptive mixer 320 has produced satisfactory results when the transition occurs from Δ=1 to Δ=2. When $g(\Delta)$ is 0.0, the difference between the filtered output pixels from the adaptive IIR filter kernel 310 and the input pixels is negligible, the input pixel is passed through to the output pixel without any change. When $g(\Delta)$ is 1.0, the output pixel is the average of the input pixel and the frame-delayed output pixel.

The leaky motion adaptive recursive temporal filter 300 shown in FIG. 3 was implemented in the Luma Preprocessing (LUPP) module, the first stage of the processing pipeline, of an MPEG2 HDTV encoder. Testing compared a 1080I movie clip compressed at a high bit rate that was generated without any filtering, generated with the motion adaptive recursive temporal filter 100 shown in FIG. 1, and generated with the leaky motion adaptive recursive temporal filter 300 shown in FIG. 3. A comparison of the night sky on these movie clips shows that the movie clip generated with the motion adaptive recursive temporal filter 100 reduced the noise, but introduced contouring in the images. The comparison also shows that the leaky motion adaptive recursive temporal filter 300 reduces the noise, thereby maintaining the effectiveness of the motion adaptive recursive temporal filter 100, without introducing contouring artifacts. The comparison also shows that the leaky motion adaptive recursive temporal filter 300 reduces the smearing artifact that is a common problem when generating a movie clip with the motion adaptive recursive temporal filter 100.

Figure 5:
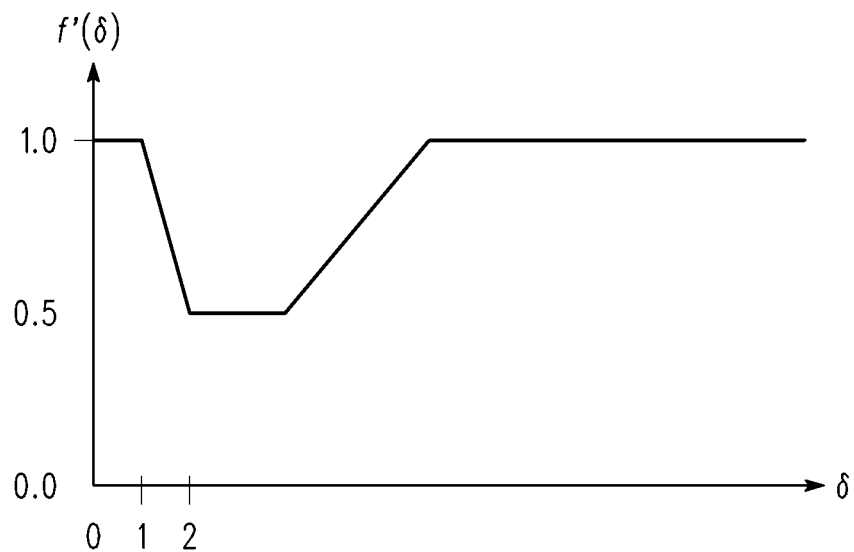
FIG. 5 is a graph that illustrates another exemplary embodiment of a non-linear adaptive function for the leaky motion adaptive recursive temporal filter shown in FIG. 3.

FIG. 5 is a graph that illustrates an exemplary embodiment of a modified non-linear adaptive function to reduce contour artifacts. The modified non-linear adaptive function is a substitute for the adaptive function 115 of the motion adaptive recursive temporal filter 100 shown in FIG. 1. In another embodiment, the modified non-linear adaptive function is a substitute for the adaptive function 315 of the leaky motion adaptive recursive temporal filter 300 shown in FIG. 3. With the modified adaptive function shown in FIG. 5, the input pixels are passed through to the output pixels when the difference between the input pixels and the output pixels from the previous process frame is less than or equal to a just noticeable perceptual threshold, which is empirically determined to be 1 for 8-bit luminance images.

Figure 6:
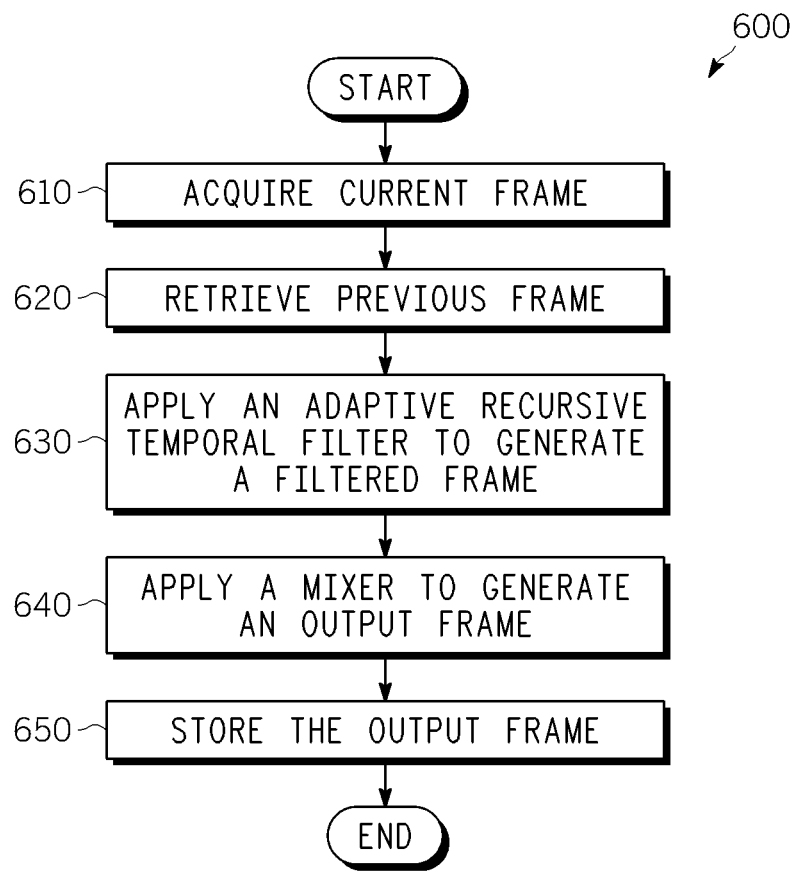
FIG. 6 is a flow chart that illustrates an exemplary embodiment of the method for reducing artifacts in a digital video sequence of image frames.

FIG. 6 is a flow chart that illustrates an exemplary embodiment of the method for reducing artifacts in a digital video sequence of image frames. The method 600 shown in FIG. 6 begins by acquiring a current frame for processing (step 610). The method then retrieves a stored copy of the previous frame (step 620) after processing to reduce artifacts. In one embodiment, the previous frame is retrieved from a frame delay. The method applies an adaptive recursive temporal filter to the current frame and the previous frame to generate a filtered frame (step 630). In one embodiment, the adaptive recursive temporal filter is the adaptive IIR filter kernel 110, shown in FIG. 1, implementing the non-linear adaptive function shown in FIG. 2. In another embodiment, the adaptive recursive temporal filter is the adaptive IIR filter kernel 110, shown in FIG. 1, implementing the modified non-linear adaptive function shown in FIG. 5. The input frame and the filtered frame are processed through an adaptive mixer to generate an output frame (step 640). In one embodiment, the adaptive mixer is the adaptive mixer 320, shown in FIG. 3, implementing the non-linear leak function shown in FIG. 4. The output frame is stored for the processing of the next frame (step 650).

This disclosure describes aspects of the present invention in the context of a motion adaptive recursive temporal filter. In another embodiment, the present invention also reduces the contour artifacts that are present after processing digital video through a motion compensated recursive temporal filter, while preserving the effectiveness of the motion compensated recursive temporal filter.

Although the disclosed exemplary embodiments describe a fully functioning system and method for reducing artifacts in a digital video sequence of image frames, the reader should understand that other equivalent exemplary embodiments exist. Since numerous modifications and variations will occur to those reviewing this disclosure, the system and method for reducing artifacts in a digital video sequence of image frames is not limited to the exact construction and operation illustrated and disclosed. Accordingly, this disclosure intends all suitable modifications and equivalents to fall within the scope of the claims.

I claim:

1. A method for reducing artifacts in a digital video sequence of image frames, comprising:
   in a leaky motion adaptive recursive temporal filter comprising an adaptive IIR filter kernel, an adaptive mixer, and a frame delay:
      acquiring a current frame of the digital video sequence and comprising current frame pixel values;
      retrieving a previous frame of the digital video sequence from a frame delay;
      in the adaptive IIR filter kernel, applying a recursive temporal filter to the current frame pixel values and the previous frame to generate a filtered frame comprising filtered frame pixel values;
      in the adaptive mixer, receiving a first input comprising the current frame pixel values, and receiving a second input comprising the filtered frame pixel values;
      allowing noise to leak through the leaky motion adaptive recursive temporal filter by applying the adaptive mixer to the current frame and the filtered frame to generate an output frame, based at least on a non-linear leak function, wherein the applying comprises calculating output pixels in the adaptive mixer for the current frame by applying the current frame pixel values and the filtered frame pixel values to the non-linear leak function; and
      storing the output frame in the frame delay.

2. The method of claim 1, wherein the current frame includes input pixels, the previous frame includes previous output pixels, and the filtered frame includes filtered pixels, the applying of the recursive temporal filter further comprising:
   computing a pixel difference between each input pixel and each previous output pixel at a corresponding location; and
   computing a pixel value for each filtered pixel based on the pixel difference.

3. The method of claim 2, wherein when the pixel difference is above an upper threshold, the pixel value is equal to a value of the input pixel, and when the pixel difference is below the upper threshold, the pixel value is a sum of the value of the input pixel and an adjustment based on the pixel difference.

4. The method of claim 3, wherein when the pixel difference is below a lower threshold, the pixel value is equal to the value of the input pixel.

5. The method of claim 1, wherein the current frame includes input pixels, the filtered frame includes filtered pixels, and the output frame includes output pixels, the applying of the mixer further comprising:
   computing a pixel difference between each filtered pixel and each input pixel at a corresponding location; and
   computing a pixel value for each output pixel based on the pixel difference.

6. The method of claim 5, wherein when the pixel difference is above an upper threshold, the pixel value is equal to a value of the filtered pixel, and when the pixel difference is below the upper threshold, the pixel value is a sum of the value of the input pixel and an adjustment based on the pixel difference.

7. The method of claim 1, wherein the mixer preserves the processing performed by the recursive temporal filter.

8. The method of claim 1, wherein the recursive temporal filter is a motion adaptive recursive temporal filter, and the mixer is an adaptive mixer.

9. The method of claim 1, wherein the recursive temporal filter is a motion compensated recursive temporal filter, and the mixer is a compensated mixer.

10. An encoding system for reducing artifacts in a digital video sequence of image frames, comprising a leaky motion adaptive recursive temporal filter, the leaky motion adaptive recursive temporal filter comprising:
a frame delay for storing a previous frame of the digital video sequence;
a recursive temporal filter comprising an adaptive IIR filter kernel for generating a filtered frame by filtering first pixel values of a current frame of the digital video sequence using previous pixel values of the previous frame; and
an adaptive mixer for allowing noise to leak through the leaky motion adaptive recursive temporal filter by generating an output frame from the current frame and the filtered frame, based at least on a non-linear leak function, by calculating output pixels in the adaptive mixer for the current frame,
wherein the adaptive mixer is configured to receive a first input comprising the first pixel values, and further configured to receive a second input comprising second pixel values based on the output from the adaptive IIR filter kernel, and
wherein the output pixels are calculated in the adaptive mixer for the current frame by applying the first input and the second input to the non-linear leak function.

11. The encoding system of claim 10, wherein the current frame includes input pixels, the previous frame includes previous output pixels, and the filtered frame includes filtered pixels, the recursive temporal filter further configured to:
compute a pixel difference between each input pixel and each previous output pixel at a corresponding location; and
compute a pixel value for each filtered pixel based on the pixel difference.

12. The encoding system of claim 11, wherein when the pixel difference is above an upper threshold, the pixel value is equal to a value of the input pixel, and when the pixel difference is below the upper threshold, the pixel value is a sum of the value of the input pixel and an adjustment based on the pixel difference.

13. The encoding system of claim 12, wherein when the pixel difference is below a lower threshold, the pixel value is equal to the value of the input pixel.

14. The encoding system of claim 10, wherein the current frame includes input pixels, the filtered frame includes filtered pixels, and the output frame includes output pixels, the mixer configured to:
compute a pixel difference between each filtered pixel and each input pixel at a corresponding location; and
compute a pixel value for each output pixel based on the pixel difference.

15. The encoding system of claim 14, wherein when the pixel difference is above an upper threshold, the pixel value is equal to a value of the filtered pixel, and when the pixel difference is below the upper threshold, the pixel value is a sum of the value of the input pixel and an adjustment based on the pixel difference.

16. The encoding system of claim 10, wherein the mixer preserves the processing performed by the recursive temporal filter.

17. The encoding system of claim 10, wherein the recursive temporal filter is a motion adaptive recursive temporal filter, and the mixer is an adaptive mixer.

18. The encoding system of claim 10, wherein the recursive temporal filter is a motion compensated recursive temporal filter, and the mixer is a compensated mixer.

19. A method for reducing artifacts in a digital video sequence of image frames, comprising:
in a leaky motion adaptive recursive temporal filter comprising an adaptive IIR filter kernel, an adaptive mixer, and a frame delay:
acquiring a current frame of the digital video sequence, the current frame including input pixels;
retrieving a previous frame of the digital video sequence from a frame delay, the previous frame including previous output pixels;
in the adaptive IIR filter kernel, applying a recursive temporal filter to the current frame and the previous frame to generate a filtered frame, the filtered frame including filtered pixels, the recursive temporal filter configured to:
compute a pixel difference between each input pixel and each previous output pixel at a corresponding location; and
compute a pixel value for each output pixel based on the pixel difference,
wherein when the pixel difference is above an upper threshold or below a lower threshold, the pixel value is equal to a value of the input pixel, and when the pixel difference is below the upper threshold and above the lower threshold, the pixel value is a sum of the value of the input pixel and an adjustment based on the pixel difference;
allowing noise to leak through the leaky motion adaptive recursive temporal filter by applying the adaptive mixer to the current frame and the filtered frame to generate an output frame, based at least on a non-linear leak function, by calculating output pixels in the adaptive mixer for the current frame,
wherein the adaptive mixer is configured to receive a first input comprising the input pixels from the current frame, and further configured to receive a second input comprising output pixels output from the adaptive IIR filter kernel, and
wherein the output pixels are calculated in the adaptive mixer for the current frame by applying the first input and the second input to the non-linear leak function; and
storing the output frame in the frame delay.

20. The method of claim 19, wherein the recursive temporal filter is a motion adaptive recursive temporal filter.

21. The method of claim 19, wherein the recursive temporal filter is a motion compensated recursive temporal filter, and the mixer is a compensated mixer.

* * * * *